US010235820B2

(12) United States Patent
Bartels

(10) Patent No.: US 10,235,820 B2
(45) Date of Patent: Mar. 19, 2019

(54) METHOD FOR SAFELY UNLOCKING AND/OR LOCKING A VEHICLE

(71) Applicant: VOLKSWAGEN AG, Wolfsburg (DE)

(72) Inventor: Bastian Bartels, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/724,681

(22) Filed: Oct. 4, 2017

(65) Prior Publication Data

US 2018/0096546 A1 Apr. 5, 2018

(30) Foreign Application Priority Data

Oct. 4, 2016 (DE) .................. 10 2016 219 135

(51) Int. Cl.
| | | |
|---|---|---|
| *B60R 25/00* | (2013.01) | |
| *G05B 19/00* | (2006.01) | |
| *G05B 23/00* | (2006.01) | |
| *G06F 7/00* | (2006.01) | |
| *G06F 7/04* | (2006.01) | |
| *G08B 29/00* | (2006.01) | |
| *G08C 19/00* | (2006.01) | |

(Continued)

(52) U.S. Cl.
CPC .......... *G07C 9/00119* (2013.01); *G06F 3/017* (2013.01); *H04L 9/3271* (2013.01); *H04W 4/40* (2018.02); *H04W 4/80* (2018.02); *H04W 12/06* (2013.01); *G06F 3/0346* (2013.01); *G06F 2203/0331* (2013.01); *H04L 2209/80* (2013.01); *H04L 2209/84* (2013.01)

(58) Field of Classification Search
CPC ............... G07C 9/00119; G06F 3/017; G06F 2203/0331; G06F 3/0346; H04W 12/06; H04W 4/80; H04L 9/3271; H04L 2209/80; H04L 2209/84

USPC ....................................................... 340/5.75
See application file for complete search history.

(56) References Cited

U.S. PATENT DOCUMENTS

2004/0201277 A1 * 10/2004 Hentsch ............. G07C 9/00309
307/10.1
2012/0229253 A1 * 9/2012 Kolar .................... B60R 25/257
340/5.61

(Continued)

FOREIGN PATENT DOCUMENTS

| DE | 19927253 A1 | 1/2001 |
|---|---|---|
| DE | 10105060 A1 | 8/2002 |

(Continued)

OTHER PUBLICATIONS

Search Report for German Patent Application No. 10 2016 219 135.7, dated May 15, 2017.

*Primary Examiner* — Tanmay Shah
(74) *Attorney, Agent, or Firm* — Barnes & Thornburg LLP

(57) ABSTRACT

A method for securely wirelessly unlocking and/or locking a vehicle using a mobile radio including detecting a motion interaction or audio interaction of a user on or with the mobile radio and accessing, in a memory device of the mobile radio, a characteristic user interaction that corresponds to a vehicle opening command. The method further includes establishing whether the user interaction matches the characteristic user interaction and, if there is a match, responding to an authentication request from the vehicle that has been obtained by the mobile radio with an encrypted response message that is sufficient to unlock the vehicle.

30 Claims, 2 Drawing Sheets

(51) Int. Cl.
*H04B 1/00* (2006.01)
*H04B 3/00* (2006.01)
*H04Q 1/00* (2006.01)
*H04Q 9/00* (2006.01)
*G07C 9/00* (2006.01)
*H04W 4/80* (2018.01)
*G06F 3/01* (2006.01)
*H04L 9/32* (2006.01)
*H04W 12/06* (2009.01)
*H04W 4/40* (2018.01)
*G06F 3/0346* (2013.01)

(56) References Cited

U.S. PATENT DOCUMENTS

2014/0240088 A1* 8/2014 Robinette .......... G08B 13/1427
340/5.61
2014/0342668 A1* 11/2014 Kyomitsu .......... G07C 9/00944
455/41.2
2015/0120151 A1 4/2015 Akay et al.
2015/0163221 A1 6/2015 Bolin et al.
2015/0332031 A1* 11/2015 Mistry .................. G06F 21/316
726/19
2016/0231421 A1* 8/2016 Murakami ............ B60R 25/245
2016/0297400 A1* 10/2016 Krishnan .............. B60R 25/241
2017/0045906 A1* 2/2017 Enshaee ................... G05G 1/02
2017/0061714 A1* 3/2017 Odejerte, Jr. ...... G07C 9/00571
2017/0166163 A1* 6/2017 Poma ..................... B60R 25/24

FOREIGN PATENT DOCUMENTS

| DE | 102011050160 A1 | 11/2012 |
| DE | 102011116157 A1 | 4/2013 |
| DE | 102012203535 A1 | 9/2013 |
| DE | 102012106522 A1 | 1/2014 |
| DE | 102013100571 A1 | 7/2014 |
| EP | 2881878 A2 | 6/2015 |

* cited by examiner

METHOD FOR SAFELY UNLOCKING AND/OR LOCKING A VEHICLE

PRIORITY CLAIM

This patent application claims priority to German Patent Application No. 10 2016 219 135.7, filed 4 Oct. 2016, the disclosure of which is incorporated herein by reference in its entirety.

SUMMARY

Illustrative embodiments relate to vehicle security, and to a method for unlocking and/or locking a vehicle. Illustrative embodiments also relate to an apparatus for unlocking and/or locking a vehicle, to a vehicle and to a corresponding computer program product.

BRIEF DESCRIPTION OF THE DRAWINGS

The disclosed embodiments are explained below on the basis of the associated drawings, in which.

DETAILED DESCRIPTION

Figure 1:
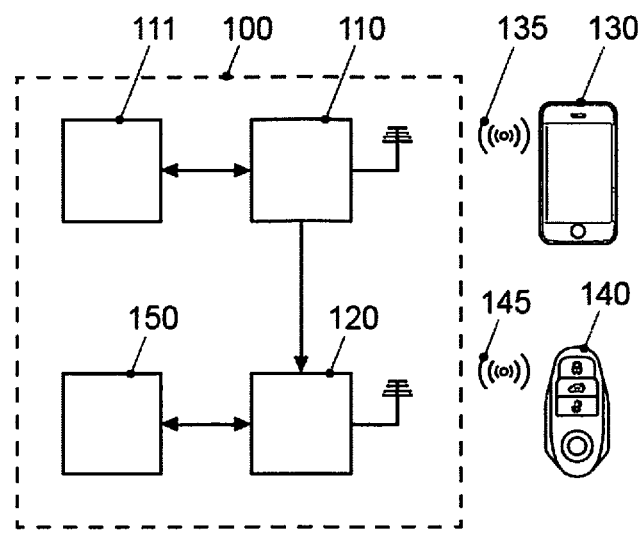
FIG. 1 shows a schematic depiction of a vehicle system for providing entry to a vehicle comprising two receivers for activating a vehicle function.

On the one hand, there is a rising need for users to unlock a vehicle without interacting with a key, or to make further interaction with the vehicle as convenient as possible. On the other hand, the need for security as part of the functionalities of vehicles is increasing to an ever greater extent.

In connection with a method for providing the driving environment for a user, EP2881878A discloses a method for vehicle control by gestures on an interface. A detection device comprises a sensor that is set up to detect one or more tap motions that are carried out by a user at arbitrary positions within a predetermined area of the vehicle as authentication input. A control device is set up to determine whether the authentication input corresponds to a stored piece of authentication information, and if there is a match, to control the vehicle, for example, by clearing a locked state of the vehicle.

DE102012203535A1 describes an apparatus and a method for controlling functions of a vehicle on the basis of gestures. A radio key is described that is set up to control at least one function in a vehicle. The radio key comprises a gesture detection module that is set up to detect a motion sequence of the radio key and a control module that is set up to initiate the performance of a function associated with the detected motion sequence in the vehicle.

It is to be expected that mobile terminals (for example, smartphones) will act as a digital set of keys in the future. A mobile device will be able to unlock hotel doors, cupboards, vehicle doors, etc., by radio. US20150120151A1 describes a vehicle system for activating a vehicle component, in which an electronic device (for example, a smartphone) uses BLUETOOTH® Low Energy (BTLE) to communicate with a first receiver of the vehicle system, and a vehicle key communicates with a second receiver of the vehicle system. Furthermore, the use of a smartwatch is described.

The document DE 10 2013 100 571 A1 describes a method for releasing a radio lock using a radio key. The method involves detecting whether or not the radio key is moved in the space. In addition, the radio lock is released only if a motion by the radio key in the space has been detected within a prescribed period of time and the radio key is authorized to release the radio lock.

The document DE 199 27 253 A1 describes a method for performing an authorization check between a controller and a transponder. The method involves checking whether or not the transponder has been moved during a predetermined interval of time before performance of the authorization check.

The document DE 101 05 060 B4 describes an access control system having a controller and also having at least one transponder that communicates with the controller via a communication channel and that has a motion sensor.

The document DE 10 2012 203 535 A1 describes a method for controlling at least one function of a vehicle. The method comprises determining whether a detected motion sequence of a radio key corresponds to a predefined gesture event.

The document DE 10 2011 116 157 A1 describes a method for operating an authorization device. In the method, keyless entry to the vehicle is permissible only if a time of a last motion of the ID transmitter is within a stipulated interval of time.

The document DE 10 2011 050 160 A1 describes a method for operating a locking system for a vehicle. The method involves determining whether an identification transmitter is motionless over a period of time.

The document US 2015/0163221 A1 describes a method for improving the performance of a wireless communication link.

The document DE 10 2012 106 522 A1 describes a method for authenticating a driver in a motor vehicle.

If a mobile device becomes the set of digital keys, operator control should be as user friendly as possible. In this context, however, user friendliness is in competition with the security of the system to be operated. The most user friendly system allows the key to remain in the pocket of the user, for example. The user does not need to remove the key from his pocket to be able to unlock the door.

However, these PKE (Passive Keyless Entry) systems have the significant drawback that operation does not involve use of the actual key. Therefore, the device representing the keyring and performing reciprocal authentication with the door/cupboard/vehicle, etc., has no knowledge of whether there is an operating requirement from the user. Only the remote station, the system to be operated, knows this operating requirement at first. As a result, the keyring is vulnerable to range extension attacks (relay-station attacks) if no additional inherent relay-station attack countermeasure is used. By way of example, when the keyring receives from the vehicle a request in regard to authentication, since the operating requirement is at first known at the vehicle end, the keyring at this time has no knowledge of whether this request is the result of a legitimate operating requirement of the user on the vehicle or just a request from a potential attacker that is forwarded over a longer distance.

Disclosed embodiments combine the security requirements with user convenience.

This is achieved by a method, a mobile radio, an apparatus, a vehicle, and a computer program product.

The disclosed method for securely wirelessly unlocking and/or locking a vehicle using a mobile radio comprises: detecting a motion interaction or audio interaction of a user on or with the mobile radio; accessing, in a memory device of the mobile radio, a characteristic user interaction that corresponds to a vehicle opening command; establishing whether the user interaction matches the characteristic user interaction; if there is a match, responding to an authentication request (challenge) from the vehicle that has been obtained by the mobile radio with an encrypted response message (response) that is sufficient to unlock the vehicle.

The disclosed method allows simple and secure unlocking and/or locking of a vehicle. This is made possible by the definition of one or more characteristic user interactions (also a combination of user interactions) that are then collated with the detected motion interaction or audio interaction. A simple interaction by the user with his mobile radio can now be used to lock or unlock a vehicle. Hitherto, a challenge/response method required PIN codes to be collated and input, which can now be dispensed with. Besides for opening and closing a vehicle, the method can be used for entry systems generally, such as doors, gates, cupboards, safes, double door systems, vehicles or computers, for example. Possible fields would be hotel chains, workplaces, automotive industry, aerospace industry, banks, commercial vehicle industry, parking systems. In all of the fields, the most convenient and at the same time secure entry possible is required.

According to disclosed embodiments, there is provision for the user, when wishing to unlock his vehicle and start the engine with his smartphone, for example, to already have a digital key for the vehicle in the secure element of his smartphone. This digital key can be used for the cryptographic entry method besides other applications, which simplifies the structure without decreasing security.

At least one disclosed embodiment of the method provides for the responding to an authentication request (challenge) to comprise: if there is a match, switching a mobile authentication module on the mobile radio from inactive to active for a predetermined period of time, the mobile radio being set up to communicate with the vehicle via a wireless short range communication link for the predetermined period of time. At least one disclosed embodiment of the method provides for the method to further comprise: sending the encrypted response message (response) to the vehicle via the wireless short range communication link during the predetermined period of time. At least one disclosed embodiment of the method provides for the method to further comprise: on obtainment of an authentication request (challenge) from the vehicle via the wireless short range communication link during the predetermined period of time, generating an encrypted response message (response) using a coding key stored in the mobile radio. This approach can further increase security, since an authentication is valid only for a particular period of time.

According to a further disclosed embodiment, the mobile radio comprises a smartphone or a smartwatch having at least one motion sensor or acceleration sensor; and the detecting of a motion interaction or audio interaction of the user comprises detecting tapping, turning and/or vibrations. In an exemplary use sequence, the user moves toward the vehicle and in so doing taps briefly twice with the flat of his hand on his smartphone, which is in his trouser pocket. The smartphone registers this definite laterally acting vibration and can distinguish it from the general walking motion of the user. The smartphone permits incoming authentication requests for a time window t that can be defined. The user grips the door handle, so that the vehicle sends an authentication request by BLUETOOTH® LE. The smartphone responds to this request with the response to the challenge of the vehicle on the basis of the challenge/response principle and therefore authenticates itself to the vehicle as an authorized vehicle key. The vehicle unlocks. The user then sits in the vehicle and operates the start button. The vehicle sends a challenge to start the engine. Since the time window is still active, the smartphone also permits this authentication request and authenticates itself by sending the response valid for the engine start challenge. The vehicle then starts its engine.

According to a further disclosed embodiment, there is provision for the characteristic user interaction to comprise a particular combination of tapping, turning and/or vibrations that has previously been stored in the mobile radio. In this way, it is possible for erroneous operating actions or incorrect identification to be reduced, which increases security. For a combination that can also comprise an audio input, inadvertent performance of this combination is improbable. In addition, when a mobile radio is stolen, for example, the characteristic user interaction cannot easily be guessed.

A further disclosed embodiment allows the user to additionally configure a personal tap sign in a mobile device app. This has the benefit not only that general motion sequences of the user can be excluded, but also that other people who do not know the tap sign cannot gain access to the vehicle (or to other systems). This additional authentication factor is therefore secret knowledge of the vehicle owner similar to a PIN or a password.

A further disclosed embodiment allows the user to configure a particular gesture. If the user has a mobile device, such as a watch (smartwatch), for example, he could jerkily turn the wrist as if he were turning a conventional key in his hand. This gesture is detected by the smartphone and, as described above, authentication requests are permitted for a particular time.

According to a further disclosed embodiment, there is provision for the mobile radio to comprise an NFC receiver in addition to or instead of the at least one motion sensor or acceleration sensor; and for the detecting of a motion interaction or audio interaction of the user to comprise the detecting of the presence, in the area of the short range radio receiver, of a user item having an NFC transmitter. According to a further disclosed embodiment, there is provision for the user item to comprise an NFC-compatible finger ring. This embodiment uses the NFC interface of the mobile device instead of the sensors described above. Before authentication requests are permitted, the user has to bring up an NFC token close to the mobile device (tapping). By way of example, the user could have an NFC-compatible finger ring. If this is brought up to the smartphone in the trouser pocket from the outside, authentication requests are allowed on the smartphone in the time window t.

According to a further disclosed embodiment, there is provision for the mobile radio to comprise a microphone in addition to or instead of the at least one motion sensor or acceleration sensor; and for the detecting of a motion interaction or audio interaction of the user to comprise the detecting of inaudible sounds. According to a further disclosed embodiment, there is provision for the characteristic user interaction to comprise a particular combination of inaudible sounds that has previously been stored in the mobile radio.

According to the disclosed embodiments, a mobile radio for unlocking a vehicle is additionally provided that comprises the following: one or more sensors for detecting motion and/or sounds; a memory device for storing a characteristic user interaction that corresponds to a vehicle opening command; and a processor that is set up to perform the method according to one of the appendant claims. The same benefits and modifications as described above apply.

According to a further disclosed embodiment, there is provision for the mobile radio to comprise a smartphone or a smartwatch having (i) at least one motion sensor or acceleration sensor and/or (ii) an NFC receiver and/or (iii) a microphone.

According to the disclosed embodiments, an apparatus for unlocking a vehicle is additionally provided that comprises the following: a communication module for setting up a wireless short range communication link to a mobile radio; a sensor for detecting the attempt of a user to open a vehicle door; and a processor that is set up to transmit an authentication request (challenge) to the mobile radio via the wireless short range communication link; and on obtainment of the encrypted response message (response), to unlock the vehicle. The same benefits and modifications as described above apply.

According to the disclosed embodiments, a vehicle is additionally provided that comprises an apparatus. The same benefits and modifications as described above apply.

The disclosure moreover also includes developments of the disclosed apparatus that have features that have already been described in connection with the embodiments of the disclosed method. For this reason, the applicable developments of the disclosed apparatus are not described again at this juncture.

The disclosed vehicle comprises an apparatus as described above and is designed to form an embodiment of the disclosed method. The same benefits and modifications as described above apply.

The disclosed computer program product comprises a program code for performing the method described above when the program product is executed on a computation unit or an apparatus of a vehicle. The same benefits and modifications as described above apply.

Further embodiments emerge from the other features cited in the subclaims.

The different embodiments that are cited in this application are combinable, unless stated otherwise in specific cases.

According to the disclosed embodiments, the smartphone is used as a vehicle key and this is intended to be done in as convenient a manner as possible. The most convenient form currently known is PKE (Pressless Keyless Entry) systems. In this case, the key can remain in the trouser pocket of the user, for example. The user pulls the door handle of the vehicle and a connection is automatically set up between vehicle and key, via which connection authentication takes place, and the user can unlock the vehicle without interacting with the key.

When a smartphone is used, the following problem arises. Radio protocols used by smartphones, such as BLUETOOTH® or LLE, for example, which have a certain range, do not afford the option of locating the key on a current basis. This locating is a main requirement: the position of the key relative to the vehicle needs to be determinable if an aim is to prevent the vehicle, in the event of a third unauthorized person pulling the door handle, from recognizing the key of the authorized user on account of a BLUETOOTH® link that may possibly still exist at this time and then unlocking the vehicle door. In such a case, a third unauthorized person could gain access to the vehicle while the authorized user is moving away from the vehicle, for example, and no longer has visual contact with the vehicle.

According to at least one disclosed embodiment, an illustrative automobile comprises a vehicle system 100 for activating at least one vehicle component 150. The vehicle component 150 can be electrically activated either directly or indirectly by other components. By way of example, as a result of a particular radio signal being obtained by a vehicle receiver, the vehicle door (not shown) can be unlocked or mechanically opened by a motorized mechanism for opening the vehicle door. After the signal is obtained, there may be different electronic circuits, for example, for decrypting the received signal, verifying the signal, interpreting the signal, transmitting and providing a signal for driving the electric motor that is connected to the vehicle door to open it.

FIG. 1 is a systematic overview of a vehicle system 100 comprising a first and second receiver 110, 120 for activating a vehicle component 150 or a function. A vehicle user approaches a vehicle with at least one mobile radio 130. The user can likewise carry an appropriate vehicle key 140; this is not needed according to disclosed embodiments, however, to gain entry to the vehicle. The mobile radio 130 can transmit a radio signal 135 to communicate with the first receiver 110 when the mobile radio 130 is in the reception area of the first receiver 110. This signal may be a BLUETOOTH® Low Energy signal. BLUETOOTH® Low Energy was designed specifically to consume very small amounts of power; therefore, these transmission and reception devices are very energy-efficient. When used in a vehicle, these devices can, on account of their quiescent current requirement when the vehicle is parked, receive radio signals 135 over a long period of time without needing to be powered down. When the user approaches the vehicle, the first receiver 110 receives a radio signal 135 from the mobile radio 130 when the mobile radio 130 is in the reception area 601 of the first receiver 110.

The radio signal 135 of the mobile radio 130 comprises first identification data. In at least one disclosed embodiment, the data comprise an identification code, so that the vehicle system 100 can check whether a particular user of the vehicle that carries the mobile radio 130 is in the reception area. The vehicle system 100 comprises a memory 111 or a memory device that stores second identification data. The memory 111 can store more than one set of second identification data. This is beneficial when more than one user uses the vehicle. As a result of the storage of multiple sets of identification data, the vehicle can distinguish between the users and their preferences if the users respectively use a different set of first identification data. The identification data can also be generated dynamically and checked dynamically on the basis of a predefined method for providing a higher security level for entry to the vehicle. The identification data can also be encrypted by the electronic device 130 and decrypted by the vehicle system 100.

If the first identification data match the at least second identification data stored in the memory 111, the first receiver 110 sends a control signal to the second receiver 120 to use a radio signal 145 to access an appropriate vehicle key 140. If the second receiver 120 correctly identifies the vehicle key as the appropriate vehicle key 140, at least one vehicle component 150 is activated or performed.

The vehicle components 150 comprise, but are not limited to, a central locking system, a vehicle door, a vehicle trunk lid, an automatic tailgate, a gas cap opening, an electric gas cap unlocking mechanism, a window opener, a sunroof, a convertible roof system, a vehicle infotainment system, a navigation system, a radio system, an air conditioning system, a seat or mirror adjusting mechanism, a steering wheel adjusting mechanism, a pedal adjusting mechanism, an exterior or interior vehicle lighting system, a driver assistance system or a vehicle camera.

A user of the vehicle can also activate at least one vehicle component 150 by directly sending the radio signal 145 from the appropriate vehicle key 140.

In the case of keyless entry systems, the touching of a vehicle door can be detected by a capacitive sensor. The keyless entry system is subsequently activated and a receiver checks the presence of an appropriate vehicle key 140.

Figure 2:
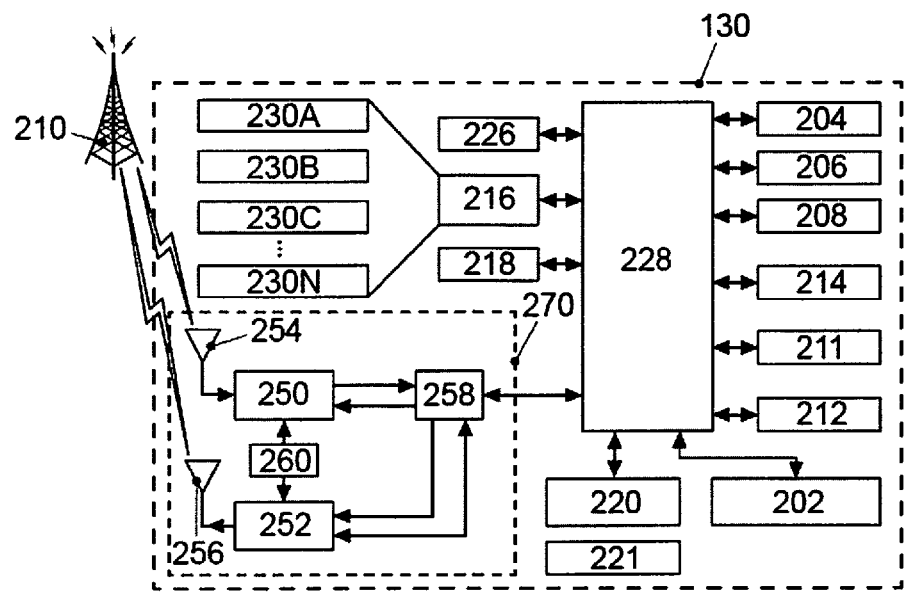
FIG. 2 shows a schematic depiction of a mobile radio according to FIG. 1.

FIG. 2 shows a block diagram of a mobile station, a terminal or a smartphone (subsequently "mobile radio") 130 that can implement one of the methods described here, for example. The mobile radio 130 is shown merely by way of example. A microprocessor 228 is shown schematically, coupled between a keypad 214 and a display 226. The microprocessor 228 controls the operation of the display 226 and the overall operation of the mobile radio 130 in response to operation of keys on the keypad 214 by a user.

In addition to the microprocessor 228, other parts of the mobile radio 130 are shown schematically. These comprise: a communication subsystem 270, a short range communication subsystem 202 (for example, BLUETOOTH®), the keypad 214 and the display 226, and also other input/output devices, including a Near Field Communication (NFC) interface 204, a set of supporting input/output devices 206, a serial interface 208, a loudspeaker 211 and a microphone 212, and also memory devices, including a Flash memory 216 and a main memory (RAM) 218, and various motion/acceleration/gyro sensors 220. The mobile radio 130 can have a battery 221 to drive the active elements of the mobile radio 130. In some disclosed embodiments, the mobile radio 130 is a two-way radio frequency (RF) communication device with voice and data communication capability. Furthermore, the mobile radio can communicate with other computer systems via the Internet in some disclosed embodiments.

Operating system software that is executed by the microprocessor 228 is stored in a permanent memory, such as the Flash memory 216, for example, in some disclosed embodiments, but can also be stored in other memory devices, such as a read only memory or similar memory elements. Furthermore, system software, special device programs or parts thereof can be temporarily loaded into a volatile memory, such as the RAM 218. Communication signals received from the mobile device 100 can likewise be stored in the RAM 218.

In addition to its operative system functions, the microprocessor 228 allows the execution of software applications on the mobile radio 130. A predetermined set of software applications that control the fundamental device operation, such as a voice communication module 230A and a data communication module 230B, for example, can be installed on the mobile radio 130 during production. In addition, it is also possible for a Personal Information Manager (PIM) application module 230C to be installed on the mobile radio 130 during production. Similarly, it is possible for further software modules, such as an authentication (door unlock) software module 230N, to be installed during production or at a later time by the user or a vehicle servicing function. The communication subsystem 270 comprises a receiver 250, a transmitter 252 and at least one antenna, which are shown as receiver antenna 254 and as transmission antenna 256. Furthermore, the communication subsystem 270 also comprises a processor module such as a digital signal processor (DSP) 258, and local oscillators (LOs) 260. The microprocessor 228 with the authentication (door unlock) software module 230N and the motion/acceleration/gyro sensors 220, the (BLUETOOTH®) communication subsystem 202, the NFC interface 204 and/or the microphone 212 comprises a functionality for implementing at least one embodiment described in detail here.

According to at least one disclosed embodiment, a (data-defining) characteristic user interaction is stored in a Flash memory 216, the characteristic user interaction corresponding to a vehicle opening command. The stored data may therefore be data for determining a particular combination of the tapping, turning and/or vibrations, or can define a particular combination of inaudible sounds. The Flash memory 216 additionally stores a key to allow encrypted communication with the vehicle via BLUETOOTH®.

Figure 3:
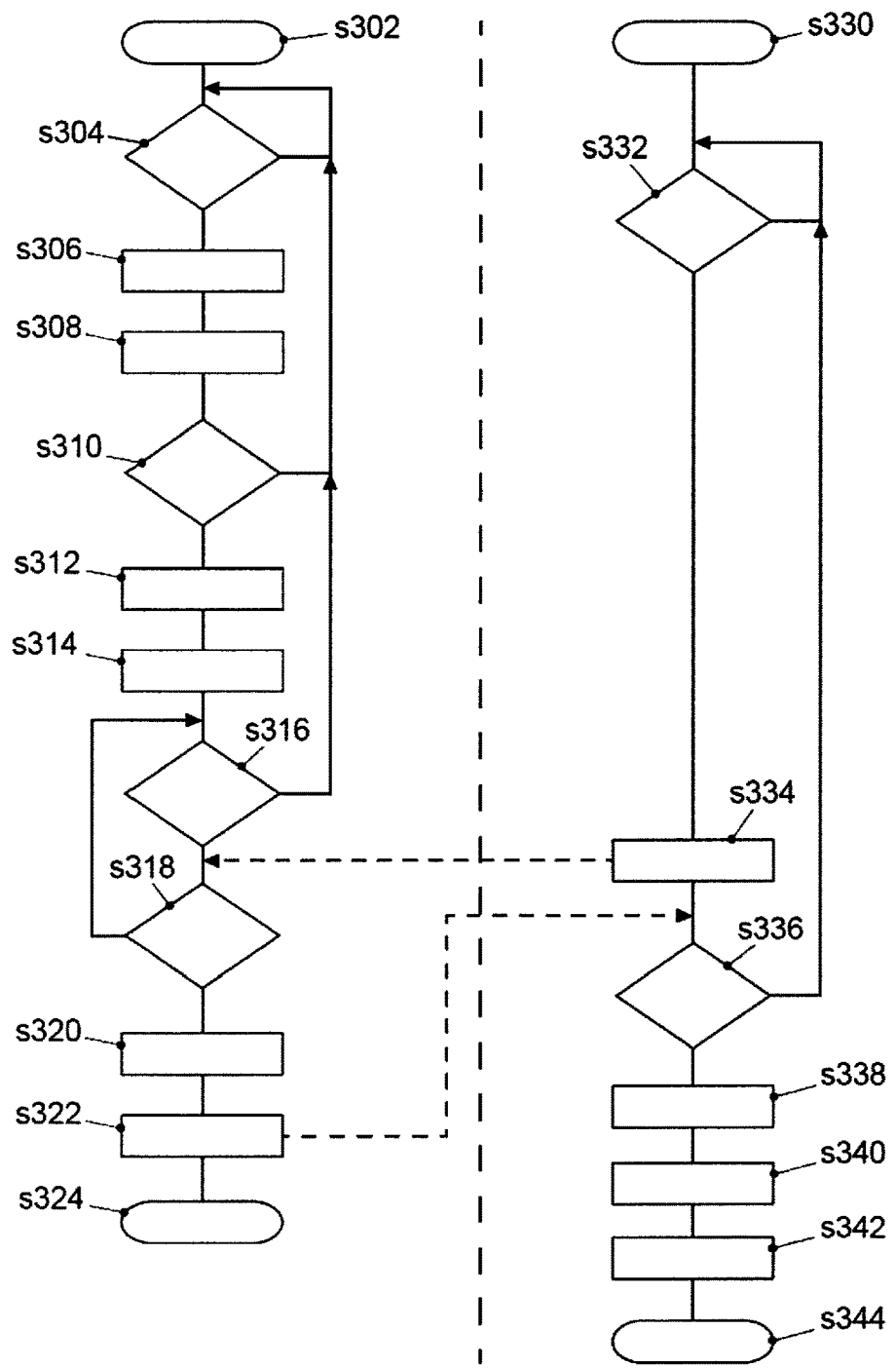
FIG. 3 shows a flowchart for the method that is implemented in the mobile radio and vehicle system of FIG. 1.

FIG. 3 shows a flowchart for a method that is implemented in the mobile radio 130 (left-hand side) and in the vehicle system 100 (right-hand side) from FIG. 1.

For the mobile radio 130, the process (left-hand side in FIG. 3) begins in operation at s302. A check takes place in operation at s304 to determine whether user interaction has been detected. If not, the process returns to operation at s304 (motion/acceleration/gyro sensors 220, (BLUETOOTH®) communication subsystem 202, NFC interface 204 and/or microphone 212 continue with the detection).

If an interaction is detected in operation at s304, data that define the type of user interaction are determined/recorded in operation at s306.

In a first disclosed embodiment, user interaction is effected as motion/vibration of the mobile radio 130. An additional safeguard can be provided by virtue of a personal tap sign being able to be configured. A tap sequence can be configured that allows general operation or jolt movements from everyday life to be excluded. If a specific tap sign is configured, detection can be improved. Furthermore, a user who does not know the configured tap sign cannot use the key, since a type of keyless entry key, such as a mobile phone, is used. The user does not interact with the key, that is to say he does not log in using the key or registers as a customer to be able to use the key. PIN input is therefore dispensed with, since the key is passive. This results in the possibility of not every user in possession of the key being able to unlock the vehicle if he does not know the tap sign. The disclosure therefore yields two significant benefits.

In a second disclosed embodiment, the mobile radio 130 is configured as a smartwatch and the user interaction is configured as a particular gesture. If the user has a smartwatch, the wrist can be turned jerkily and the smartwatch as a passive key would respond to the jerky wrist motion. Therefore, it is not necessary to tap the watch, but rather the gesture can be made as a normal hand motion that is easily possible from an anatomical point of view, for example, a jerky turn of the wrist, as though the watch were being adjusted. The gesture can also be detected using the same method with a motion or acceleration sensor.

In a third disclosed embodiment, an NFC interface is used. In this disclosed embodiment, the user uses a finger ring that is NFC compatible, for example. This finger ring may also be passive, that is to say without a power source/battery of its own. Only when the user has moved the NFC-compatible finger ring toward the smartphone and the smartphone has detected this does the smartphone respond as a keyless entry key.

In a fourth disclosed embodiment, the very high-quality built-in microphone of the smartphone is used. In this disclosed embodiment, a sound is sent to the item of the user in the inaudible range and only then does the smartphone react. In this disclosed embodiment, the trigger to which the smartphone is meant to react is not a vibration or a gesture, but rather an inaudible sound. The user would not hear the sound. The sound is audible only over a limited range, and only the item that the user carries and that outputs this sound can be used to temporarily switch the smartphone to the mode to respond to an authentication request from the vehicle.

Referring to FIG. 3, as soon as data that define the type of the user interaction have been determined/recorded in operation at s306, one or all characteristic interactions are retrieved from the memory in operation at s308. Next (operation at s310), it is determined for the or for each stored interaction whether it matches the user interaction recorded in operation at s306. If there is no match, the process returns to operation at s304.

If there is a match in operation at s310, the microprocessor 228 switches the authentication module 230N to active in operation at s312 and starts the timer in operation at s314. The timer provides the user with a time window, that is to say a predetermined period of time, to get into the vehicle. The length of the predetermined period of time may be between 10-120 seconds, 20-60 seconds or 30-45 seconds. A check is performed (operation at s316) to determine whether the predetermined period of time has elapsed, and if so, the process returns to operation at s304.

If it is established in operation at s316 that the predetermined period of time has elapsed, a check is performed (operation at s318) to determine whether an authentication request (challenge) has been obtained from the vehicle (entry) system 100 via BLUETOOTH®. If not, the process returns to operation at s316.

If it is established in operation at s318 that an authentication request (challenge) has been obtained, the microprocessor 228 generates an encrypted response message in operation at s320 using the stored code. The encrypted response message is then transmitted to the vehicle (entry) system 100 via BLUETOOTH® in operation at s322. The process ends in operation at s324.

Referring to the right-hand side in FIG. 3, the process in the vehicle (entry) system 100 begins in operation at s330. First of all (operation at s332), a check is performed to determine whether the sensor on the vehicle indicates an attempt by a user to open a door of the vehicle. If not, the process returns to operation at s330 (the sensor continues the monitoring).

If it is established in operation at s332 that there has been an attempt by a user to open a door of the vehicle, an (encrypted) authentication request (challenge) is sent to the mobile radio 130 via BLUETOOTH® in operation at s334. A check is performed (operation at s336) to determine whether an authentication response to the authentication request has been obtained via BLUETOOTH®. If not, the process returns to operation at s330 (the sensor continues the monitoring).

If it is established in operation at s336 that a response to the authentication request has been obtained via BLUETOOTH®, the encrypted response message is decrypted in operation at s338. The response message is then authenticated in operation at s340. As soon as it is authenticated, the vehicle doors are unlocked in operation at s342. The user can accordingly open the vehicle door(s). The process ends in operation at s344.

If the smartphone is used as a vehicle key, this is intended to be done as conveniently as possible. For this reason, a different trigger is needed so that the smartphone does not authenticate itself to the car as a key if the user does not want to access the car and still wishes to keep the smartphone in his pocket. According to the present disclosure, or embodiments thereof, the acceleration sensors of the smartphone are used for this purpose by virtue of the smartphone being tapped in the pocket and subsequently the door handle being pulled as customary for keyless entry systems. The perception of the tapping by the sensors of the smartphone prompts the smartphone to perform an authentication.

A benefit of the disclosure is that standard relay-station attacks on the smartphone in the case of keyless entry systems are therefore no longer possible, because an attacker would need to perform a motion interaction or audio interaction, such as tapping, for example, with the smartphone beforehand and has no access thereto, however. Without detection of the tapping, the smartphone would not respond to requests from a possible vehicle with a cryptographic response.

LIST OF REFERENCE SYMBOLS

100 Vehicle system
110 First receiver
111 Memory
120 Second receiver
130 Mobile radio
135 Radio signal
140 Vehicle key
145 Radio signal
150 Vehicle component
202 Short range communication subsystem
204 Near Field Communication (NFC) interface
206 Supporting input/output devices
208 Serial interface
211 Loudspeaker
212 Microphone
214 Keypad
216 Flash memory
218 Main memory (RAM)
220 Motion/acceleration/gyro sensors
221 Battery
226 Display
228 Microprocessor
230A Voice communication module
230B Data communication module
230C Personal Information Manager (PIM) application module
230N Authentication (door unlock) software module
250 Receiver
252 Transmitter
254 Receiver antenna
256 Transmission antenna
258 Digital signal processor (DSP)
260 Local oscillators (LOs)
270 Communication subsystem
601 Reception area

The invention claimed is:

1. A method for securely wirelessly unlocking and/or locking a vehicle using a mobile radio, the method comprising:
detecting a motion interaction or audio interaction of a user on or with the mobile radio;
accessing, in a memory device of the mobile radio, a characteristic user interaction that corresponds to a vehicle opening command;
establishing whether the user interaction matches the characteristic user interaction; and
in response to the match, responding to an authentication request from the vehicle that has been obtained by the mobile radio with an encrypted response message that is sufficient to unlock the vehicle,
wherein the responding to the authentication request comprises:
in response to the match, switching a mobile authentication module on the mobile radio from inactive to active for a predetermined period of time, and the mobile radio being set up to communicate with the vehicle via a wireless short range communication link for the predetermined period of time.

2. The method of claim 1, further comprising sending the encrypted response message to the vehicle via the wireless short range communication link during the predetermined period of time.

3. The method of claim 1, further comprising:
obtaining the authentication request from the vehicle via the wireless short range communication link during the predetermined period of time, and
generating an encrypted response message using a coding key stored in the mobile radio.

4. The method of claim 1, wherein the mobile radio comprises a smartphone or a smartwatch having at least one motion sensor or acceleration sensor, and the detecting of a motion interaction or audio interaction of the user comprises detecting tapping, turning and/or vibrations.

5. The method of claim 1, wherein the characteristic user interaction comprises a particular combination of tapping, turning and/or vibrations that has previously been stored in the mobile radio.

6. The method of claim 1, wherein the mobile radio further comprises an NFC receiver in addition to the at least one motion sensor or acceleration sensor; and
the detecting of a motion interaction or audio interaction of the user comprises the detecting of the presence, in the area of the short range radio receiver, of a user item having an NFC transmitter.

7. The method of claim 6, wherein the user item comprises an NFC-compatible finger ring.

8. The method of claim 6, wherein the mobile radio comprises a microphone in addition to the at least one motion sensor or acceleration sensor; and
the detecting of a motion interaction or audio interaction of the user comprises the detecting of inaudible sounds.

9. The method of claim 1, wherein the characteristic user interaction comprises a particular combination of inaudible sounds that has previously been stored in the mobile radio.

10. A mobile radio for unlocking a vehicle, the mobile radio comprising:
one or more sensors for detecting motion and/or sounds;
a memory device for storing a characteristic user interaction that corresponds to a vehicle opening command; and
a processor that performs a method for securely wirelessly unlocking and/or locking the vehicle using the mobile radio, the method comprising:
detecting a motion interaction or audio interaction of a user on or with the mobile radio;
accessing, in the memory device of the mobile radio, a characteristic user interaction that corresponds to a vehicle opening command;
establishing whether the user interaction matches the characteristic user interaction; and
in response to the match, responding to an authentication request from the vehicle that has been obtained by the mobile radio with an encrypted response message that is sufficient to unlock the vehicle,
wherein the responding to the authentication request comprises:
in response to the match, switching a mobile authentication module on the mobile radio from inactive to active for a predetermined period of time, and the mobile radio being set up to communicate with the vehicle via a wireless short range communication link for the predetermined period of time.

11. The mobile radio of claim 10, wherein the method performed by the processor further comprises sending the encrypted response message to the vehicle via the wireless short range communication link during the predetermined period of time.

12. The mobile radio of claim 10, wherein the method performed by the processor further comprises:
obtaining the authentication request from the vehicle via the wireless short range communication link during the predetermined period of time, and
generating an encrypted response message using a coding key stored in the mobile radio.

13. The mobile radio of claim 10, wherein the mobile radio comprises a smartphone or a smartwatch having at least one motion sensor or acceleration sensor, and the detecting of a motion interaction or audio interaction of the user comprises detecting tapping, turning and/or vibrations.

14. The mobile radio of claim 10, wherein the characteristic user interaction comprises a particular combination of tapping, turning and/or vibrations that has previously been stored in the mobile radio.

15. The method of claim 1, wherein the mobile radio further comprises an NFC receiver in addition to the at least one motion sensor or acceleration sensor; and
wherein the detecting of a motion interaction or audio interaction of the user comprises the detecting of the presence, in the area of the short range radio receiver, of a user item having an NFC transmitter.

16. The mobile radio of claim 15, wherein the user item comprises an NFC-compatible finger ring.

17. The mobile radio of claim 15, wherein the mobile radio comprises a microphone in addition to the at least one motion sensor or acceleration sensor; and
the detecting of a motion interaction or audio interaction of the user comprises the detecting of inaudible sounds.

18. The mobile radio of claim 10, wherein the characteristic user interaction comprises a particular combination of inaudible sounds that has previously been stored in the mobile radio.

19. The mobile radio of claim 10, wherein the mobile radio comprises a smartphone or a smartwatch having at least one motion sensor or acceleration sensor and/or an NFC receiver and/or a microphone.

20. An apparatus for unlocking a vehicle, comprising:
a communication module for setting up a wireless short range communication link to a mobile radio;
a sensor for detecting the attempt of a user to open a vehicle door; and
a processor that is set up
to transmit an authentication request to the mobile radio via the wireless short range communication link; and
in response to obtaining the encrypted response message, to unlock the vehicle,
wherein the mobile radio includes one or more sensors for detecting motion and/or sounds, a memory device for storing a characteristic user interaction that corresponds to a vehicle opening command, and a processor that performs a method for securely wirelessly unlocking and/or locking the vehicle using the mobile radio, the method comprising:

detecting a motion interaction or audio interaction of a user on or with the mobile radio;

accessing, in the memory device of the mobile radio, a characteristic user interaction that corresponds to a vehicle opening command;

establishing whether the user interaction matches the characteristic user interaction; and in response to the match, responding to an authentication request from the vehicle that has been obtained by the mobile radio with an encrypted response message that is sufficient to unlock the vehicle, wherein the responding to the authentication request comprises:

in response to the match, switching a mobile authentication module on the mobile radio from inactive to active for a predetermined period of time, and the mobile radio being set up to communicate with the vehicle via a wireless short range communication link for the predetermined period of time.

21. A vehicle comprising the apparatus according to claim 20.

22. A non-transitory computer program product having program code for performing a method for securely wirelessly unlocking and/or locking a vehicle using a mobile radio when the program product is executed on an apparatus or a vehicle, the method comprising:

detecting a motion interaction or audio interaction of a user on or with the mobile radio;

accessing, in a memory device of the mobile radio, a characteristic user interaction that corresponds to a vehicle opening command;

establishing whether the user interaction matches the characteristic user interaction; and in response to the match, responding to an authentication request from the vehicle that has been obtained by the mobile radio with an encrypted response message that is sufficient to unlock the vehicle, wherein the responding to the authentication request comprises:

in response to the match, switching a mobile authentication module on the mobile radio from inactive to active for a predetermined period of time, and the mobile radio being set up to communicate with the vehicle via a wireless short range communication link for the predetermined period of time.

23. The non-transitory computer program product of claim 22, wherein the method further comprises sending the encrypted response message to the vehicle via the wireless short range communication link during the predetermined period of time.

24. The non-transitory computer program product of claim 22, wherein the method further comprises:

obtaining the authentication request from the vehicle via the wireless short range communication link during the predetermined period of time, and generating an encrypted response message using a coding key stored in the mobile radio.

25. The non-transitory computer program product of claim 22, wherein the mobile radio comprises a smartphone or a smartwatch having at least one motion sensor or acceleration sensor, and the detecting of a motion interaction or audio interaction of the user comprises detecting tapping, turning and/or vibrations.

26. The non-transitory computer program product of claim 22, wherein the characteristic user interaction comprises a particular combination of tapping, turning and/or vibrations that has previously been stored in the mobile radio.

27. The non-transitory computer program product of claim 22, wherein the mobile radio further comprises an NFC receiver in addition to the at least one motion sensor or acceleration sensor; and the detecting of a motion interaction or audio interaction of the user comprises the detecting of the presence, in the area of the short range radio receiver, of a user item having an NFC transmitter.

28. The non-transitory computer program product of claim 27, wherein the user item comprises an NFC-compatible finger ring.

29. The non-transitory computer program product of claim 27, wherein the mobile radio comprises a microphone in addition to the at least one motion sensor or acceleration sensor; and the detecting of a motion interaction or audio interaction of the user comprises the detecting of inaudible sounds.

30. The non-transitory computer program product of claim 22, wherein the characteristic user interaction comprises a particular combination of inaudible sounds that has previously been stored in the mobile radio.

\* \* \* \* \*